(12) United States Patent
Eckstein et al.

(10) Patent No.: US 8,687,366 B2
(45) Date of Patent: Apr. 1, 2014

(54) APPARATUS FOR SUPPLYING VOLTAGE TO A MOTOR VEHICLE HAVING OPTIMIZED HEAT DISSIPATION

(75) Inventors: Frank Eckstein, Munich (DE); Bjoern Lath, Munich (DE); Hubertus Goesmann, Nattheim-Auernheim (DE); Micha Dirmeier, Munich (DE); Alexander Meijering, Munich (DE); Philipp Petz, Munich (DE); Nicolas Flahaut, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 106 days.

(21) Appl. No.: 13/181,672

(22) Filed: Jul. 13, 2011

(65) Prior Publication Data

US 2011/0267778 A1 Nov. 3, 2011

Related U.S. Application Data

(63) Continuation of application No. PCT/EP2009/008865, filed on Dec. 11, 2009.

(30) Foreign Application Priority Data

Jan. 14, 2009 (DE) .......................... 10 2009 004 543

(51) Int. Cl.
*H05K 7/20* (2006.01)
*F28F 7/00* (2006.01)
*H01M 10/50* (2006.01)

(52) U.S. Cl.
USPC ........ 361/699; 361/710; 361/716; 361/274.2; 165/80.4; 165/80.5; 165/104.33; 429/120

(58) Field of Classification Search
USPC ............ 361/679.46–679.54, 688–723, 274.2; 165/80.2–80.5, 104.33, 185; 257/712, 257/714–716, 721; 174/15.1, 16.1, 252; 429/120
See application file for complete search history.

(56) References Cited

U.S. PATENT DOCUMENTS 3,537,907 A * 11/1970 Wilson .......................... 429/120
(Continued)

FOREIGN PATENT DOCUMENTS

DE  102 23 782 A1  12/2003
DE  102 38 235 A1   3/2004
(Continued)

OTHER PUBLICATIONS

German Search Report dated Oct. 29, 2009 with partial English translation (nine (9) pages).

(Continued)

*Primary Examiner* — Zachary M Pape
(74) *Attorney, Agent, or Firm* — Crowell & Moring LLP

(57) ABSTRACT

A voltage supply apparatus for a motor vehicle, especially a passenger car, truck or a motorcycle, includes a storage cell arrangement having one or more electrochemical storage cells and/or double layer capacitors that are mounted on top of each other. The storage cell arrangement is releasably connected in a form-fitting way to a heat-conducting cooling device that removes heat from the storage cells and/or double layer capacitors such that at least some of the storage cells and/or double layer capacitors of a respective storage cell group can each be thermally connected with the heat-conducting cooling device.

20 Claims, 4 Drawing Sheets

(56) References Cited

U.S. PATENT DOCUMENTS

| | | | | |
|---|---|---|---|---|
| 4,443,523 | A * | 4/1984 | Hasennauer | 429/99 |
| 6,087,038 | A * | 7/2000 | Flament et al. | 429/120 |
| 7,597,993 | B2 * | 10/2009 | Glauning et al. | 429/120 |
| 7,858,220 | B2 * | 12/2010 | Shimizu | 429/120 |
| 2005/0064280 | A1 * | 3/2005 | Watanabe et al. | 429/120 |
| 2005/0170241 | A1 * | 8/2005 | German et al. | 429/120 |
| 2006/0078789 | A1 * | 4/2006 | Wegner | 429/120 |
| 2007/0020513 | A1 * | 1/2007 | Medina et al. | 429/120 |
| 2008/0233470 | A1 * | 9/2008 | Zhu et al. | 429/90 |
| 2008/0292949 | A1 * | 11/2008 | Shen et al. | 429/120 |
| 2008/0305388 | A1 * | 12/2008 | Haussman | 429/120 |
| 2009/0301700 | A1 | 12/2009 | German et al. | |

FOREIGN PATENT DOCUMENTS

| | | |
|---|---|---|
| DE | 10 2006 059 989 A1 | 6/2008 |
| DE | 10 2007 021 293 A1 | 11/2008 |
| DE | 10 2007 031 674 A1 | 1/2009 |
| FR | 2 782 399 A1 | 2/2000 |
| WO | WO 2007/033651 A1 | 3/2007 |
| WO | WO 2007/076985 A2 | 7/2007 |
| WO | WO 2008/122384 A1 | 10/2008 |

OTHER PUBLICATIONS

International Search Report dated Feb. 3, 2010 with English translation (six (6) pages).
Translation of Chinese Office Action dated May 20, 2013 (two (2) pages).

* cited by examiner

APPARATUS FOR SUPPLYING VOLTAGE TO A MOTOR VEHICLE HAVING OPTIMIZED HEAT DISSIPATION

CROSS-REFERENCE TO RELATED APPLICATIONS

This application is a continuation of PCT International Application No. PCT/EP2009/008865, filed Dec. 11, 2009, which claims priority under 35 U.S.C. §119 from German Patent Application No. DE 10 2009 004 543.0, filed Jan. 14, 2009, the entire disclosures of which are herein expressly incorporated by reference.

BACKGROUND AND SUMMARY OF THE INVENTION

The invention relates to an apparatus for supplying voltage to a motor vehicle, especially a passenger car, truck or a motorcycle, with a storage cell arrangement that comprises one or more electrochemical storage cells and/or double layer capacitors that are arranged on top of each other.

Electrochemical storage cells and/or double layer capacitors can achieve considerable temperatures in operation, so cooling is necessary. The cooling of the electrochemical storage cells occurs from the outside. If adequate cooling cannot be ensured with sufficient safety, defects can quickly occur that cannot be economically reconciled with the requirements for service life with use in automobiles.

From DE 10 2007 021 293 A1, a drive battery module of an electrical, fuel cell or hybrid vehicle of this general type is known in which one or more profile elements, called "fins," extend from cooling pipes that have cooling medium flowing through them. What is disadvantageous about this arrangement is the complex structure of the drive battery module, which in the case of a defect requires the complete replacement of the drive battery module.

Therefore, it is the object of the present invention to provide a simply structured voltage supply apparatus for a motor vehicle, especially for the electric motor drive of the motor vehicle, in which adequate cooling with high safety can be ensured by a cooling device.

This and other objects are achieved by a voltage supply apparatus for a motor vehicle, especially a passenger car, a truck or a motorcycle, with a storage cell arrangement that comprises one or more electrochemical storage cells and/or double layer capacitors that are arranged one above the other. The storage cell arrangement can be releasably force fit connected to a heat-conducting cooling device that removes heat supplied from the storage cells and/or double layer capacitors such that at least some of the storage cells and/or double layer capacitors of one respective storage cell group can each be thermally connected to the heat-conducting cooling device.

One advantage of the apparatus according to the invention consists of a simple modular structure in which many common parts can be installed. The apparatus comprises two main components that can be connected to one another with positive locking and can be released from one another, each of which can be designed as common parts. For one thing, the self-contained storage cell arrangement also designated as a module comprises elements between the storage cells and/or double layer capacitors conducting only (passive) heat. For another, the heat-conducting apparatus comprises the elements necessary for cell cooling. The cooling of the storage cells can only occur if the storage cell arrangement and the cooling elements are connected mechanically to one another since only then does the necessary thermal coupling of the two components to one another exist.

The electrochemical storage cells are preferably lithium-based battery cells or nickel-metal hybrid batteries, which are distinguished by high storage capacity with low volume. The storage cells or double layer capacitors each have a circular, prismatic, rectangular or square, oval or flat oval cross section. According to the requirements, in this way storage cell arrangements and/or modules can be formed of several storage cells and/or double layer capacitors that have high packing density. For electrical insulation, their outer circumferential surfaces are designed to be electrically insulating or provided with an electrically insulating layer that preferably conducts heat well.

According to an effective design, the storage cell arrangement includes a storage cell and/or double layer capacitor group. Such a group can comprise two or more storage cells and/or double layer capacitors adjacent to one another. In this case, the storage cells and/or double layer capacitors of a respective storage cell group are connected thermally to each other by at least one heat-conducting profile element, which makes possible a heat transfer between the storage cells and/or double layer capacitors of the storage cell group.

In addition to a good connection of the storage cell arrangement to the heat-conducting cooling device, a uniform temperature distribution between the storage cells and/or double layer capacitors of the storage cell arrangement is achieved. This is achieved by a thermal compensation between adjacent storage cells and/or double layer capacitors of a storage cell and/or double layer capacitor group. The design complication is low here. Because of the uniform temperature distribution between adjacent storage cells and/or double layer capacitors, a high service life is achieved for the apparatus according to the invention.

In order to achieve good heat conduction as well as tolerance compensation between the heat-conducting cooling device and the storage cells and/or the double layer capacitors, an elastic, heat-conducting layer can be provided between these elements. In order to achieve good heat conducting between the storage cells and/or double layer capacitors and the profile elements, they can be glued to each other, whereby preferably a heat-conducting adhesive is used.

In order to achieve not only a thermal compensation between adjacent storage cells and/or double layer capacitors of a storage cell group, but to also achieve the best possible heat dissipation in the direction of the heat-conducting cooling device, according to an advantageous embodiment it is provided that the heat-conducting cooling device is in thermal contact with the at least one profile element. Depending on the design of the at least one profile element, the heat-conducting cooling device can be in contact exclusively with the profile element. Also, the thermal contact can be provided both between the profile element and also one of the storage cells and/or double layer capacitors.

According to another advantageous design, the storage cells and/or double layer capacitors of the storage cell arrangement have a shroud surface as well as a base and cover surface with the respective electrodes connected by the shroud surface, whereby the at least one profile element is in thermal contact at least with the shroud surfaces of the storage cells and/or double layer capacitors of one storage cell group. Because of the large heat transfer surface, uniform temperature distribution is promoted between the storage cells and/or double layer capacitors of a storage cell group.

In order to further improve the heat conduction, the at least one profile element is formed of a material that conducts heat well, especially a metal plate or a (thicker in comparison to this) metal bowl or a filled plastic element.

According to another advantageous embodiment, the at least one profile element has a shape that is adapted to the surface design of the shroud surfaces of the storage cells and/or double layer capacitors of at least one storage cell group. In this way, the heat exchange between adjacent storage cells and/or double layer capacitors, as well as the transfer of heat to the heat-conducting cooling device, is also promoted.

According to another design, the at least one profile element has a wing-shaped cross section, which includes a first and a second contact section. The first contact section is in contact with a shroud surface of a first storage cell and/or of a first double layer capacitor of the storage cell group. The second contact section is in thermal contact with the shroud surface of a second storage cell and/or of a second double layer capacitor of the storage cell group. In this way, the first and the second contact section are connected to each other as one piece in an area between the first and the second storage cell and/or the double layer capacitor. Because of the wing-shaped cross section, it is ensured that the profile element is in contact over a large surface with the storage cells and/or double layer capacitors of at least one storage cell and/or double layer capacitor group. Because of the large area connection produced in this way, uniform temperature distribution is achieved. In addition, heat removal by way of the profile element to the heat-conducting cooling device can also be promoted. Because of the wing-shaped cross section, the assembly of the apparatus according to the invention is also made simpler.

Advantageously, on the free ends of the first and second contact sections of the at least one profile element, a third contact section is connected that is in mechanical and thermal contact with the heat-conducting cooling device. Because of the provision of a third contact section, no special requirements are set for the shape of the heat-conducting cooling device. In particular, the heat-conducting cooling device can have a flat surface that is brought into contact with the respective third contact sections of a number of profile elements.

In an alternative design, one part of the first and the second contact section is in mechanical and thermal contact with the heat-conducting cooling device. This design requires a form-fitting heat-conducting cooling device, by which an outstanding heat transfer from the storage cells and/or the double layer capacitors is ensured.

In particular, the first and/or the second contact section of the at least one profile element comes to rest in a common first and/or in a common second plane in an area turned toward the heat-conducting cooling device. Because of this, a respective flat wall of the heat-conducting device can be brought into mechanical and thermal contact with the first and second contact sections.

In another design, between two storage cell groups that are arranged on top of each other, two profile elements are arranged symmetrically with respect to a plane that runs perpendicular to the direction of extension of the storage cell groups. The two profile elements can be designed as one piece or formed by two separate components. This also ensures simple assembly. If the two profile elements are designed as a single piece, heat exchange between two storage cell and/or double layer capacitor groups disposed on top of one another is also thereby made possible.

In order to ensure high mechanical stability of the apparatus according to the invention, a carrier element is provided between the two profile elements. The carrier element is especially made of plastic and is adapted in its shape. It may be effective if the plastic is also a good heat conductor since then a heat exchange can also occur between two adjacent storage cell and/or double layer capacitor groups.

In another design, the heat-conducting cooling device includes a cooler wall which is provided at the side walls of the storage cell arrangement and has cooling channels that have a heat-removing medium, especially a refrigerant like R 134a, carbon dioxide, R 744, water or air, etc., flowing through it or flowing around it. In this way, heat removal can be ensured continuously in a reliable and adequate manner even during short-term peak loads on the storage cell. The cooling channels can be connected, e.g., in a circuit of an air conditioning system of the motor vehicle.

According to another advantageous design, the cooler wall comprises a flat surface with which it contacts the three contact sections of the at least one profile element. One advantage of this design is that an assembly of the apparatus in an extension direction of the storage cell and/or double layer capacitor groups over each other is possible. Because of this, for example, simple replacement is also possible in the case of a defect in the apparatus without the cooling device having to be replaced.

In an alternative design, the cooler wall has a design that is inverse to that of the storage cell arrangement. In particular, a trough is provided between two storage cells and/or double layer capacitors, whereby in the trough a cooling channel runs. Because of this, the storage cell arrangement can only be mounted in an axial direction of the storage cells and/or double layer capacitors in the heat-conducting cooling device. However, the cooling channels mounted in the troughs can be guided especially close to the storage cells and/or double layer capacitors so that optimum heat removal is possible.

In order to further improve the heat removal, it is also provided that the heat-conducting cooling devices provided on the two opposite sides of the storage cell arrangement are tensioned with respect to each other between at least two storage cells and/or double layer capacitors (and/or storage cell groups and/or double layer capacitor groups) in order to generate a compressive force between the profile elements and the storage cells. At the same time, the heat-conducting cooling devices are also pressed on the storage cells and/or double layer capacitors. Because of this, the heat transfer can be improved.

It is also provided that the heat-conducting cooling device has a heat-conducting element adapted to the design of the storage cell arrangement with which the cooler wall is connected with heat conduction. Because of this, a simple and more cost-effective manufacturing of the apparatus is possible since the heat-conducting element, e.g., is formed from one piece of metal (and without cooling channels). In contrast, the cooler wall can be designed with flat surfaces in which the cooling ducts are arranged.

Another design provides that the storage cell arrangement is stressed in the extension direction of the storage cells and/or double layer capacitor groups arranged on top of each other by at least one tensioning device, especially one made of plastic, with a pre-stress force. The pre-stress force can be created by welding, bolting, or use of a tensioning belt, a clamping pin or tension wire, etc. It is also advantageous if another tensioning device is provided in the axial direction of the storage cells and/or double layer capacitors, which is connected with positive locking or form fitting with the tensioning device named above. Because of this, the previously mentioned tensioning device is held in position so that overall a compact, stable apparatus is provided.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, components with the same functions are provided with the same reference numbers. The drawings only represent the basic structure of an apparatus for supplying voltage according to the invention, wherein the individual components of the apparatus are not necessarily shown to scale.

FIGS. 1 to 4 show, in schematic cross section representations, a cutout of an apparatus 1 for supplying voltage to a motor vehicle, especially a passenger car or a motorcycle. The apparatus 1 includes a storage cell arrangement 10 with a number of storage cells and/or double layer capacitors 11-1, 11-2, 12-1, 12-2. In order to make the following description easier, reference is only made to storage cells and/or storage cell groups. However, this must not be considered a restriction, as reference to a storage cell and/or storage cell group is also meant to include a double layer capacitor and/or a double layer capacitor group.

Figure 1:
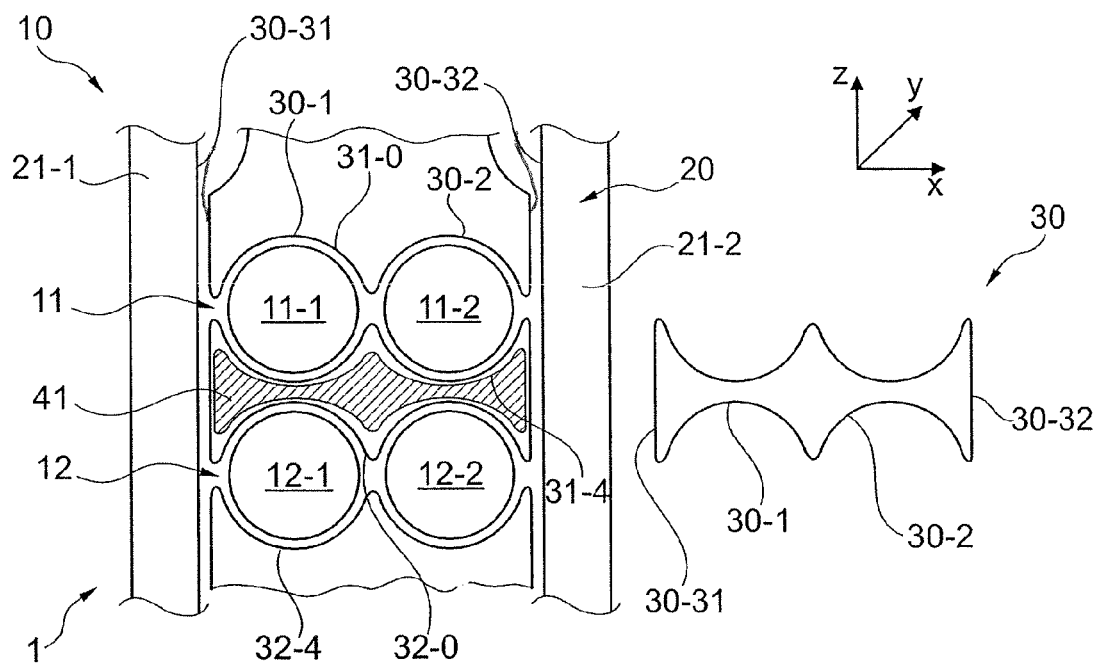
FIG. 1 is a cutout of a voltage supply apparatus according to a first embodiment of the invention.

In the first exemplary embodiment of FIG. 1, two storage cell groups 11, 12 are shown, which are arranged one above the other in one extension direction (i.e., in the z-direction of the coordinate system shown). In the exemplary embodiment, each of the storage cell groups contains two storage cells 11-1, 11-2 or 12-1, 12-2. One storage cell group can also include more than two storage cells arranged adjacent to each other, i.e., in the x-direction and/or perpendicular to the extension direction.

In a known manner, each of the storage cells 11-1, 11-2, 12-1, 12-2 has at least one metal electrode (not shown) arranged in the storage cell, whereby the metal electrode can largely be provided over its entire surface with a metal layer, which also cannot be seen from FIG. 1. In a manner that is also known, the metal electrode connecting element lying inside (not shown) can be connected so that it is electrically conductive with a connecting terminal that is provided outside the respective storage cell on the front side and/or a connecting terminal provided on the reverse side outside the storage cell. The connection terminal can be a contact surface in the form of a socket, like a battery terminal that is contacted by contact springs. Above the connecting terminals, the respective storage cells 11-1, 11-2, 12-1, 12-2 of the storage cell arrangement 10 are connected in series and/or in parallel so that a total voltage of the storage cell arrangement can be picked off at terminal posts (not shown). The storage cell arrangement is also designated as a module.

On both sides of the storage cell groups 11, 12, a heat-conducting cooling device 20 is mounted, which in the exemplary embodiment in FIG. 1 is formed by a cooler wall 21-1 and 21-2. The cooler walls 21-1, 21-2 are connected to the storage cell arrangement such that they conduct heat. In the cooler walls 21-1, 21-2, cooling channels (not shown) are provided. The cooling channels have a heat-dissipating medium, especially a refrigerant like R 134a, carbon dioxide, R 744, water or air, etc., flowing through or around them. Since each of the storage cell groups 11, 12 in the exemplary embodiment has only two storage cells 11-1, 11-2 and/or 12-1, 12-2, each of the storage cells 11-1, 11-2, 12-1, 12-2 is in thermal connection with the heat-conducting cooling device 20 and/or one of the cooling walls 21-1, 21-2 so that the heat supplied by the storage cells can be removed.

In order to further increase the reliability of the voltage supply apparatus 1, the storage cells of a respective storage cell group 11, 12 are thermally connected to each other by at least one heat-conducting profile element so that the heat transfer is possible at least between storage cells 11-1 and 11-2 and/or 12-1 and 12-2 of the associated storage cell group 11 or 12. In the exemplary embodiment of FIG. 1, four such profile elements 31-0, 31-4, 32-0 and 32-4 are shown. These profile elements are formed of material with good heat conductivity, preferably of a metal plate. The profile elements 31-0 and 32-4 can be designed as separate profile elements. These, as well as all profile elements provided between two storage cell groups, can also be designed in one piece so that the profile element designated with reference character 30 results, which is shown as an example to the right of the apparatus shown in FIG. 1.

The profile elements arranged above and below a storage cell group, e.g., by being inserted, reinforce the heat conduction into the respective shroud surfaces of the storage cells. The profile elements thus provide for good thermal exchange in the x-direction and possibly, if the profile elements provided between two storage cell groups are designed as one piece, also in the z-direction.

The contour of the profile elements in cross section is adapted to the shape of the storage cells. Thus, the profile elements 31-0, 31-4, etc. have a wing-shaped cross section. In this case, each profile element has a first contact section 30-1 that is in thermal contact with the shroud surface of the storage cell (11-1, 12-1, etc.) on the left in the figure of a storage cell group 11, 12. The profile element has a second contact section 30-2 that is in thermal contact with the shroud surface of the storage cells 11-2, 12-2 on the right side of the figure of storage cell groups 11, 12. In an area between the left and right storage cell, the first and second contact sections are connected to each other to form one piece. The first and second contact sections 30-1 and 30-2 thus have a large-area connection to the shroud surfaces of the storage cells 11-1, 11-2 and 12-1, 12-2 so that good thermal exchange is ensured between the two storage cells of a storage cell group.

At the free ends of the first and second contact sections 30-1, 30-2, in each case a third contact section 30-31, 30-32 connects which extends in the z-direction of the coordinate system and thus is in thermal contact over the surface with the cooler walls 21-1, 21-2 of the heat-conducting cooling device 20. In this design, the storage cells are thus connected by way of the profile elements to the heat-conducting cooling device 20.

To increase the stability and to create pressure with which the profile elements are pressed on the storage cells, carrier elements 41 with adapted forms are provided between each of the two profile elements (in this case: 31-4 and 32-0).

For weight reasons, the carrier elements are especially manufactured of plastic. As can be seen without difficulty from FIG. 1, the carrier elements 41 have a shape that is adapted to the design of the profile elements 31-4 and 32-0 arranged over each other or the single-piece profile element 30. In each case, the profile elements only contact the carrier elements at three points, on the two outsides as well as between the two storage cells. In this way, an ideal contact of the profile elements to the surface of the storage cells is created. The carrier elements can, for example, be made of a PP molded part. It is preferred if the carrier elements are good heat conductors. Beyond that, the carrier elements 41 also provide for good contact of the profile elements on the storage cells.

Figure 2:
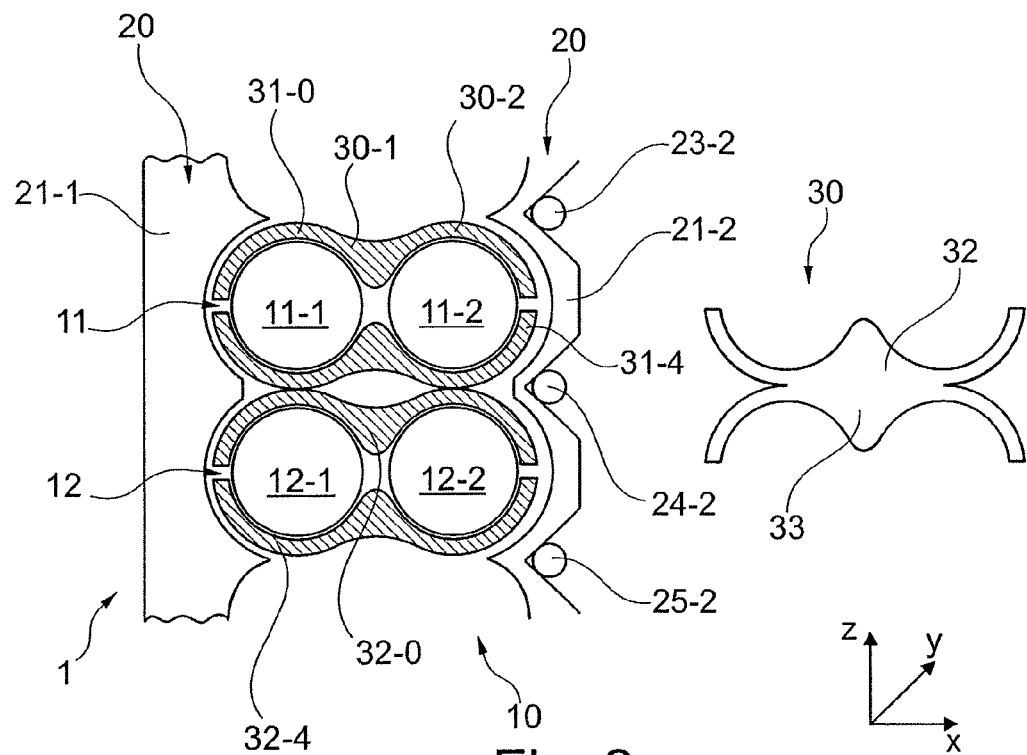
FIG. 2 is a cutout of a voltage supply apparatus according to a second embodiment of the invention.

In comparison to the first embodiment, FIG. 2 shows a modified second embodiment. In it, the profile elements are made of a heat-conducting material, especially a metal shell, each of which has a first contact section 30-1 and a second contact section 30-2, but no third contact sections. In contrast to the metal plates that were used in the exemplary embodiment of FIG. 1, the metal shells are thicker in comparison to this. The profile elements can be designed, e.g., of extruded profiles. As in the embodiment example already described, the profile elements (in this case: 31-4 and 32-0) inserted between two storage cell groups 11, 12 can be designed as two separate parts or as a single unit. A corresponding illustration of a one-piece profile element is shown on the right in FIG. 2 with the reference number 30.

Due to the third contact sections that are not present, the heat-conductive cooling device 20 must be designed so that its shape is adapted to the storage cell arrangement 10. The heat removal from the storage cells 11-1, 11-2, 12-1, 12-2 to the cooler walls 21-1, and 21-2 provided on the left and right of the storage cell arrangement 10 in turn occurs by way of the profile elements (in this case: 31-0, 31-4, 32-0, 32-4). In this case, FIG. 2 shows two different embodiments of possible cooler walls. On the left side of the storage cell apparatus, cooling channels (not shown) run on the inside of the cooler wall 21-1. In contrast, on the side turned away from the storage cell arrangement 10, in the area of two storage cell groups 11, 12 arranged on top of each other, the cooler wall 21-2 has troughs in which one cooling channel 23-2, 24-2, 25-2 is arranged. For example, the cooler wall 21-2 can be formed of a corrugated plate that is mounted on a plate. Both cooler walls 21-1, 21-2 have, as can be seen with no problems from the figure, the characteristic that the side 10 turned toward the storage cell arrangement has a shape that is the inverse of it so that good thermal contact to the profile elements 31-0, 31-4, 32-0, 32-4 is ensured.

With regard to assembly technology, the first embodiment that is shown in FIG. 1 offers advantages in comparison to the embodiment shown in FIG. 2. Namely, the storage cell arrangement provided with the profile elements can be mounted in the y- or z-direction in the heat-conducting cooling device 20. In contrast, for joining the storage cell arrangement 10 (with the profile elements already provided in it) and the cooling device 20 of the second embodiment, an assembly in the y-direction is necessary.

Figure 3:
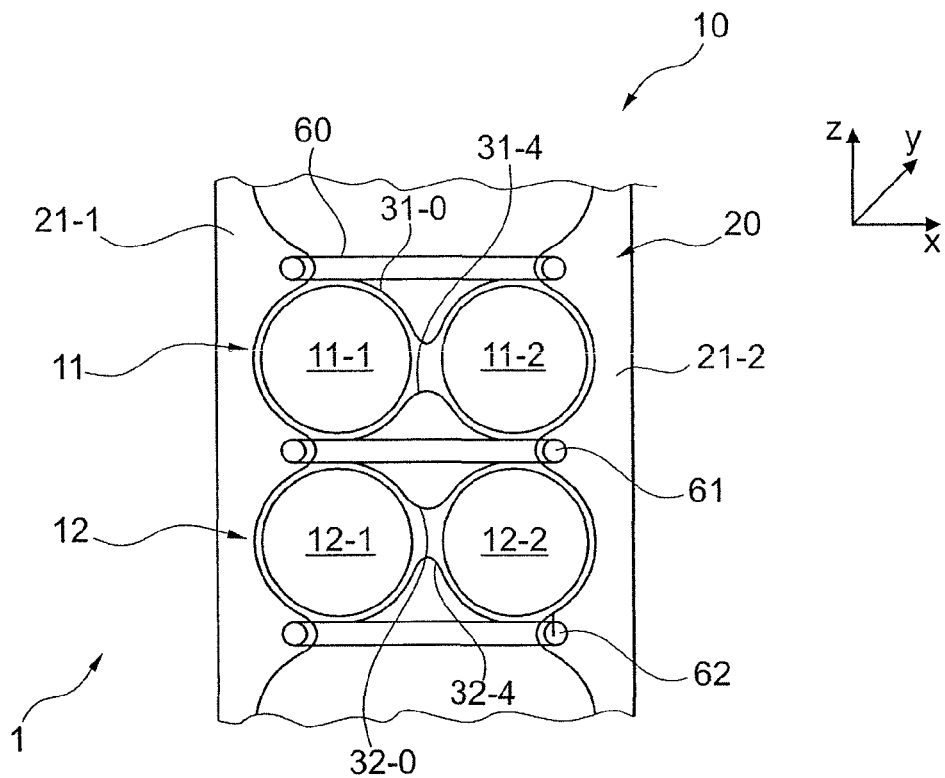
FIG. 3 is a cutout of a voltage supply apparatus according to a third embodiment of the invention.

FIG. 3 shows a third embodiment, which includes tensioners 60, 61, 62 as an additional design characteristic. The tensioners are provided above and below, and/or between, each of the two storage cell groups 11, 12. The tensioners tension together the cooler walls 21-1, 21-2 to the side of the storage cell arrangement 10. In this way, a compression force is generated between the profile elements and the storage cells, as well as between the profile elements and the cooler walls, whereby the heat transfer is made easier. The cooler walls 21-1, 21-2 shown in FIG. 3 can alternatively represent a heat sink, which with its outside can be brought into contact with corresponding cooler walls in which cooling channels are guided. This has the advantage of simplified assembly in the z-direction.

Figure 4:
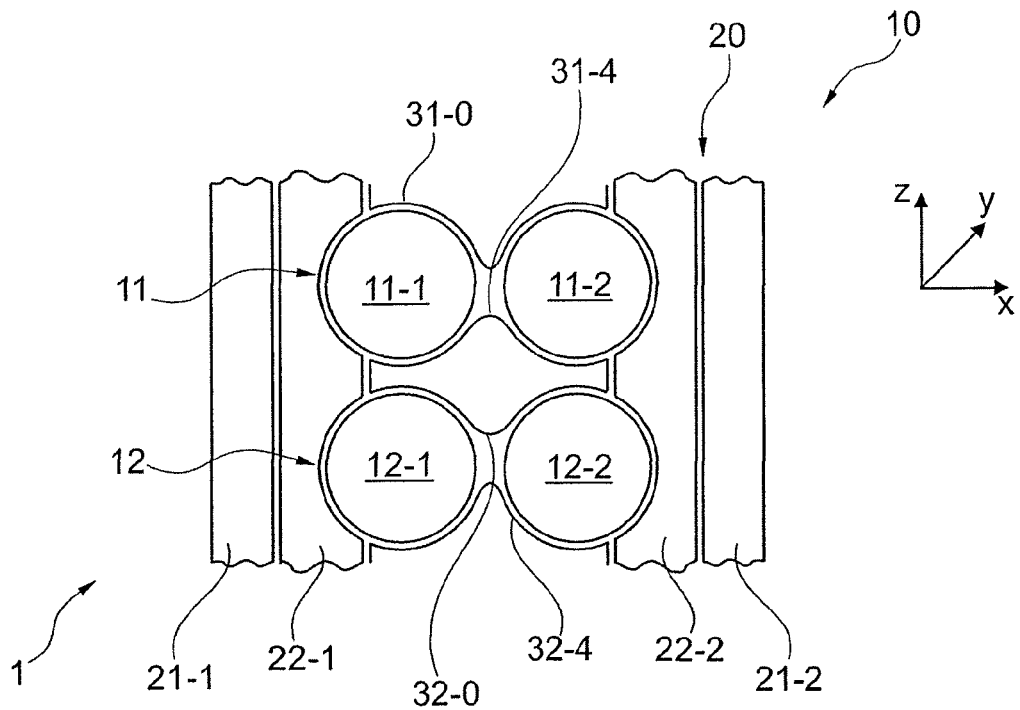
FIG. 4 is a cutout of a voltage supply apparatus according to a fourth embodiment of the invention.

FIG. 4 shows a further modification in comparison to the previous embodiments, wherein the heat-conducting cooling device 20 has, on both sides of the storage cell arrangement 10, a cooler wall 21-1, 21-2 with a cooling channel that guides refrigerant (not shown) and a heat sink 22-1, 22-2 (without cooling channels). The heat sinks 22-1, 22-2 can be formed, for example, from extruded profiles and have a shape that is adapted so that it is inverse to the design of the storage cell arrangement 10. In the area where the heat sinks 22-1, 22-2 are brought into contact with the cooler walls 21-1, 21-2, the heat sink and the cooler walls have flat surfaces in order to make the manufacturing and assembly easier. In the manner of the previous embodiments, the heat sinks 22-1, 22-2 are in thermal contact with the profile elements (in this case: 31-0, 31-4, 32-0, 32-4). The heat sinks 22-1, 22-2 also make possible a temperature distribution in the z-direction, i.e., in the starting direction of the storage cell groups 11, 12.

In an embodiment that is not shown, the profile elements can also be "flattened" on one side so that these areas come to rest in a common plane. Because of this, the heat sink (as shown, e.g., in FIG. 4) or the cooler wall (see the left cooler wall in FIG. 2) can be designed with a flat wall and with this flat wall can thermally contact the profile elements. Because of this, manufacturing and assembly are simplified.

In order to obtain good heat conduction and tolerance compensation between the heat sink or the cooler wall and the profile elements, an elastic heat-conducting layer can be provided between these elements.

FIGS. 5a, 5b show, respectively, perspective views of a voltage supply apparatus and a complete assembly. The storage cell arrangement comprises, for example, five storage cell groups 11, 12, 13, 14, 15, which are arranged on top of each other (i.e., extending in the z-direction). In the manner already described above, profile elements in the form of metal plates are inserted above the storage cell group 11 as well as between the storage cell groups 11 and 12, 12 and 13, 13 and 14, 14 and 15 and below the storage cell group 15, which make possible heat exchange between the individual storage cells and the heat-conducting cooling device not shown in FIGS. 5a and 5b. In FIG. 5a, it can also easily be seen that between the respective lower profile elements (-4) and upper profile elements (-0), carrier elements 42, 43, 44 are provided. Such carrier elements, in adapted shape, are also provided above the storage cell group 11 and/or the profile elements 31-0 (reference number 40) and below the storage cell group 15 and/or the profile elements 35-4 (reference number 45).

In order to cause stress in the z-direction and thereby bring the profile elements 31-0, 31-4, . . . , 35-0, 35-4 into good thermal contact with the storage cells, tensioning devices 51, 52 are provided. The tensioning devices are mounted on the storage cell arrangement 10 in the axial direction of the storage cells (i.e., in y-direction). In this case, the tensioning devices 51, 52 achieve mechanical engagement with the carrier elements 40, 45, whereby the desired force is created in the z-direction. On their upper and lower sides, the tensioning devices 51, 52 can each be mechanically connected to each other by way of another cover (not shown). Due to corresponding recesses in the tensioning devices 51, 52, an electrical contacting of each electrode of the storage cells to the face surfaces is possible. Alternatively (or as a support), the tensioning force can also be created using a tensioning belt, clamping pins, tensioning belts, screws or gluing of the profile elements to the storage cells in order to create the compression force in the z-direction. A tensioning and/or compressing in the x-direction occurs after bringing the device shown in FIG. 5b into the heat-conducting cooling device. Bringing the apparatus 1 into the heat-conducting cooling device and/or removing it from the heat-conducting cooling device can optionally occur in the z-direction or the y-direction.

FIGS. 6a, 6b show a perspective view of an apparatus according to the invention for voltage supply according to the second embodiment, whereby FIG. 6a shows the apparatus before the final assembly and FIG. 6b the apparatus after final assembly. As can be clearly recognized from FIG. 6a, the profile elements 31-0, 30 and 35-4 are designed as metal shells. The profile elements are designed as one piece between the respective storage cell groups 11, 12, 13, 14, 15 and, therefore, uniformly marked with reference number 30. The profile elements 30 are designed with sections that are flattened on the sides, which (in the drawing on the left and right of the apparatus) lie in a common plane in order to make possible thermal contact with a flat cooler wall. Because of the greater stability of the profile elements of this embodiment, no carrier elements are necessary between the individual profile elements. The tensioning in the z-direction again occurs by mounting of tensioning devices 51, 52 from the face surfaces of the storage cells. In this case, the necessary tensioning force is ensured by the shaping of the tensioning devices 51, 52 (easy to see in FIG. 6a). In addition, the tensioning devices 51, 52 can be provided with a cover on their upper and lower side so that the tensioning devices 51, 52 cannot loosen from the storage cell arrangement 10. The device for creating tension 1 shown in FIG. 6b can, in turn, be introduced or removed from a heat-conducting cooling device (not shown) in the z- or y-direction, whereby the continuous advantageous tensioning and/or compression in x-direction is ensured.

Figure 5:
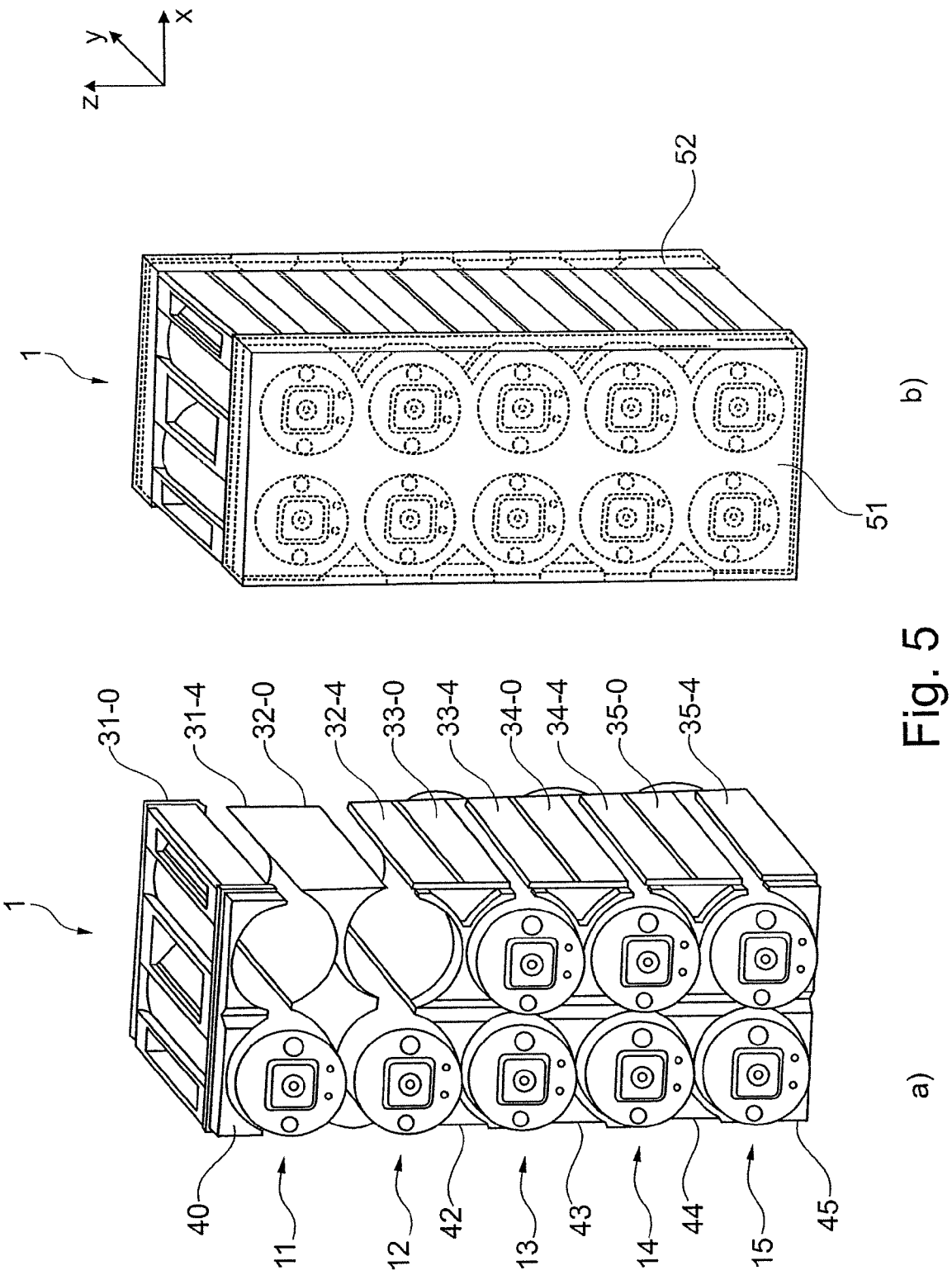
FIGS. 5a, 5b show perspective representations of the voltage supply apparatus according to the first embodiment.
Figure 6:
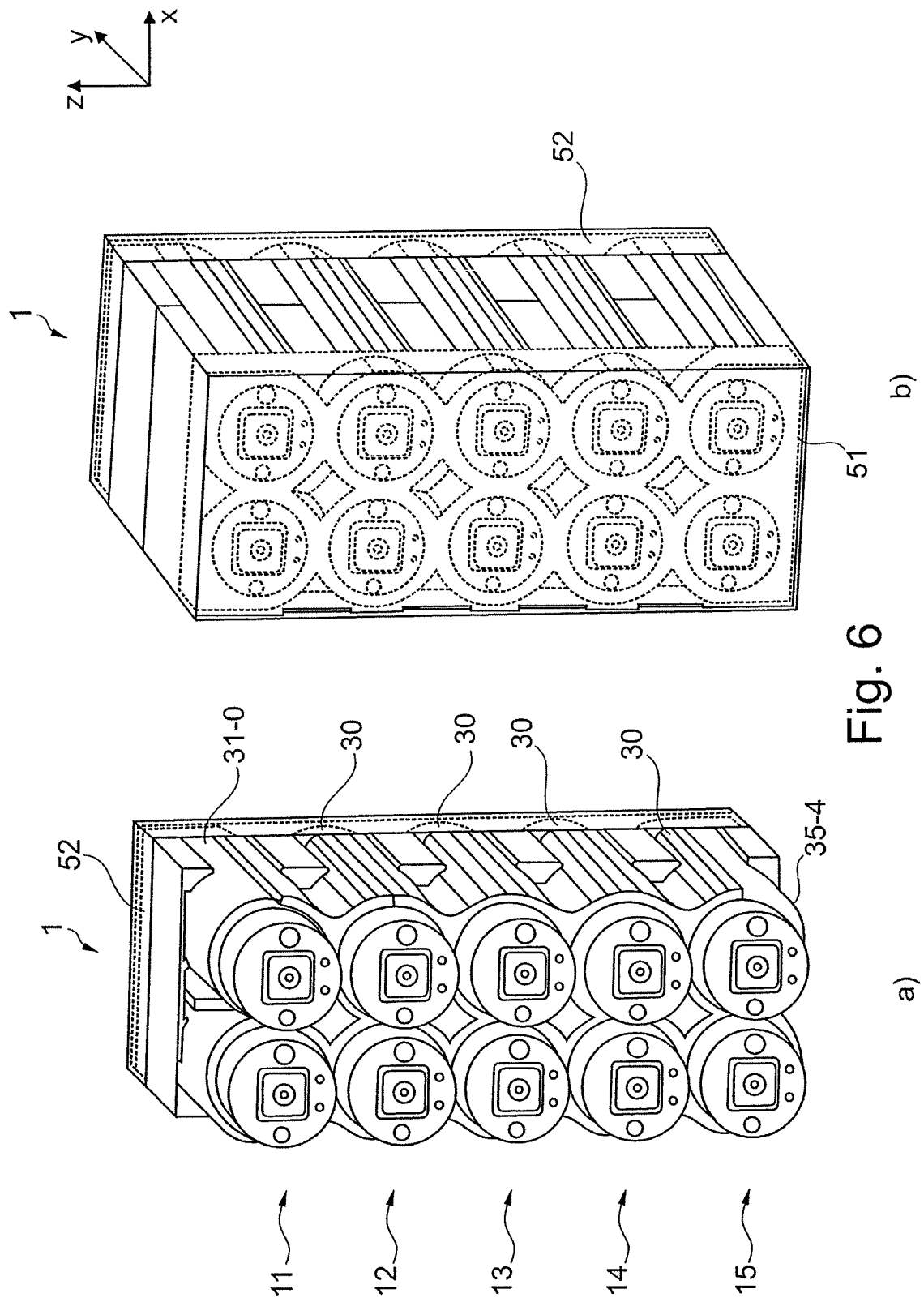
FIGS. 6a, 6b show perspective representations of the voltage supply apparatus according to the second embodiment.

After mounting of the tensioning devices 51, 52 according to the exemplary embodiments according to FIGS. 5 and 6, the storage cells are welded by means of cell connectors. The cover not shown in FIG. 5b/6b provides for electrical insulation in order to ensure simple handling.

Table of Reference Numbers

| | |
|---|---|
| 1 | Voltage supply apparatus |
| 10 | Storage cell arrangement |
| 11 | Storage cell group/double layer capacitor group |
| 12 | Storage cell group/double layer capacitor group |
| 13 | Storage cell group/double layer capacitor group |
| 14 | Storage cell group/double layer capacitor group |
| 15 | Storage cell group/double layer capacitor group |
| 11-1 | Storage cell/double layer capacitor |
| 11-2 | Storage cell/double layer capacitor |
| 12-1 | Storage cell/double layer capacitor |
| 13-2 | Storage cell/double layer capacitor |
| 20 | Cooling device |
| 21-1 | Cooler wall |
| 21-2 | Cooler wall |
| 22-1 | Heat sink |
| 22-2 | Heat sink |
| 23-2 | Cooling channel |
| 24-2 | Cooling channel |
| 25-2 | Cooling channel |
| 30-1 | First contact section |
| 30-2 | Second contact section |
| 30-31 | Third contact section |
| 30-32 | Third contact section |
| 31-o | Profile element |
| 31-u | Profile element |

-continued

Table of Reference Numbers

| | |
|---|---|
| 32-o | Profile element |
| 32-u | Profile element |
| 33-o | Profile element |
| 33-u | Profile element |
| 34-o | Profile element |
| 34-u | Profile element |
| 35-o | Profile element |
| 35-u | Profile element |
| 40 | Carrier element |
| 41 | Carrier element |
| 42 | Carrier element |
| 43 | Carrier element |
| 44 | Carrier element |
| 45 | Carrier element |
| 51 | First tensioning device |
| 52 | Second tensioning device |
| 60 | Tensioning |
| 61 | Tensioning |
| 62 | Tensioning |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A voltage supply apparatus for a motor vehicle, comprising:
a storage cell arrangement comprising one or more electrochemical storage cells and/or double layer capacitors disposed one above the other;
a heat-conducting cooling device for removing heat from said storage cells and/or double layer capacitors, the heat-conducting cooling device having cooling channels through which a heat-dissipating medium flows; and
at least one heat-conducting profile element separate from the heat-conducting cooling device;
wherein the at least one heat-conducting profile element does not include coolant flow passages,
wherein the storage cell arrangement is releasably form-fittingly connectable to the heat-conducting cooling device to thermally connect at least some of the one or more storage cells and/or double layer capacitors with the heat-conducting cooling device,
wherein the heat-conducting cooling device is substantially without apertures between adjacent ones of the electrochemical storage cells and/or double layer capacitors and a surface of the heat-conducting cooling device facing the at least some of the one or more storage cells and/or double layer capacitors;
wherein the storage cell arrangement comprises one or more groups of storage cells and/or double layer capacitors disposed one above the other;
and wherein the storage cells and/or double layer capacitors of a respective group are connected to one another via the heat-conducting profile element, whereby heat transfer between the storage cells and/or double layer capacitors of the respective group occurs via the heat-conducting profile element.

2. The apparatus according to claim 1, wherein the heat-conducting cooling device is operatively configured to be in thermal contact with the at least one profile element.

3. The apparatus according to claim 1, wherein:
the storage cells and/or double layer capacitors have a shroud surface and an electrode connected by a base and cover area of the shroud surface; and
wherein the at least one profile element is operatively configured to be in thermal contact with the shroud surfaces of the storage cells and/or double layer capacitors of a respective group.

4. The apparatus according to claim 1, wherein the at least one profile element is formed of a high heat-conducting material.

5. The apparatus according to claim 1, wherein the at least one profile element has a shape adapted to a surface design of shroud surfaces of the storage cells and/or double layer capacitors of a respective group.

6. The apparatus according to claim 1, wherein:
the at least one profile element has a wing-shaped cross-section, a first contact section of which is in thermal contact with a shroud surface of a first storage cell and/or a first double layer capacitor of a respective group and a second contact section is in thermal contact with a shroud surface of a second storage cell and/or second double layer capacitor of a respective group; and
whereby the first and second contact sections are connected to form one-piece in an area between the first and the second storage cell and/or double layer capacitor.

7. The apparatus according to claim 6, wherein a third contact section is formed on free ends of the first and the second contact sections of the at least one profile element, the third contact section being in mechanical and thermal contact with the heat-conducting cooling device.

8. The apparatus according to claim 6, wherein a portion of the first and second contact sections is in mechanical and thermal contact with the heat-conducting cooling device.

9. The apparatus according to claim 8, wherein:
at least one of the first contact section and the second contact section of the profile element is arranged in a common first and/or common second plane in an area facing the heat-conducting cooling device; and
wherein a respective flat wall of the heat-conducting cooling device is brought into mechanical and thermal contact with the first and the second contact section.

10. The apparatus according to claim 6, wherein the heat-conducting cooling device comprises a cooler wall arranged on side walls of the storage cell arrangement.

11. The apparatus according to claim 10, wherein the cooler wall comprises a flat surface which contacts third contact sections of the at least one profile element, the third contact sections being on free ends of the first and second contact sections of the at least one profile element.

12. The apparatus according to claim 10, wherein the cooler wall is adapted to an adjacent outer surface of the storage cell arrangement.

13. The apparatus according to claim 12, wherein the cooler wall comprises a trough adapted to mate with an area between two storage cells and/or double layer capacitors, a cooling channel extending through the trough.

14. The apparatus according to claim 1, wherein between groups arranged one above the other, two profile elements are arranged symmetrically with respect to a plane extending perpendicular to a stacking direction of the two groups.

15. The apparatus according to claim 14, wherein the two profile elements are configured as one-piece or two separate pieces.

16. The apparatus according to claim 14, further comprising a form-adapted carrier element made of plastic, the carrier element being arranged between the two profile elements.

17. The apparatus according to claim 1, wherein the heat-conducting cooling device provided on two opposite sides of the storage cell arrangement are tensioned with one another through at least two storage cells and/or double layer capacitors, whereby a compression force is created between the profile element and the storage cells.

18. The apparatus according to claim 1, wherein the heat-conducting cooling device comprises a heat sink adapted to an outer surface design of the storage cell arrangement, the heat sink connecting with a cooler wall in order to conduct heat.

19. The apparatus according to claim 1, wherein in an extension direction of a respective group, the storage cell arrangement is stressed with a tensioning force via at least one plastic tensioning device.

20. The apparatus according to claim 19, wherein a fastening component is provided in an axial direction of the storage cells and/or double layer capacitors.

* * * * *